United States Patent [19]

Tojo et al.

[11] Patent Number: 4,877,817

[45] Date of Patent: Oct. 31, 1989

[54] CHLORINATED RUBBER

[75] Inventors: Tetsuo Tojo; Takashi Nakahara; Yasuhiko Otawa, all of Ichihara; Katsuo Okamoto, Funabashi, all of Japan

[73] Assignee: Mitsui Petrochemical Industries, Ltd., Tokyo, Japan

[21] Appl. No.: 287,066

[22] Filed: Dec. 21, 1988

Related U.S. Application Data

[62] Division of Ser. No. 133,425, Dec. 15, 1987, Pat. No. 4,814,390, which is a division of Ser. No. 924,869, Oct. 30, 1986, Pat. No. 4,764,564.

[30] Foreign Application Priority Data

Oct. 31, 1985 [JP] Japan .................................. 60-242716

[51] Int. Cl.[4] .............................................. C08F 6/00
[52] U.S. Cl. .................................. 521/142; 525/331.7
[58] Field of Search .......................................... 521/142

[56] References Cited

U.S. PATENT DOCUMENTS

| | | | |
|---|---|---|---|
| 2,810,706 | 10/1957 | Frazier et al. | 260/45.5 |
| 3,658,770 | 4/1972 | Longi et al. | 260/79.5 |
| 3,897,405 | 7/1975 | Son et al. | 260/79.5 |
| 3,936,430 | 2/1976 | Schoen et al. | 525/331.7 |
| 3,936,523 | 2/1976 | Kleeberg et al. | 264/211 |
| 3,975,335 | 8/1976 | Tiessens et al. | 526/283 |
| 4,025,497 | 5/1977 | Natta et al. | 260/79.5 |
| 4,099,003 | 7/1978 | Popoff et al. | 544/137 |
| 4,200,722 | 4/1980 | Pennings et al. | 526/282 |
| 4,234,705 | 11/1980 | Matoba | 525/329 |
| 4,621,121 | 11/1986 | Schwarze et al. | 525/329.3 |

Primary Examiner—Joseph L. Schofer
Assistant Examiner—Bernard Lipman
Attorney, Agent, or Firm—Sherman and Shalloway

[57] ABSTRACT

A chlorinated rubber having a chlorine content of 10 to 45% by weight based on the weight of the chlorinated rubber and a Mooney viscosity, $ML_{1+4}$ (121° C.), of 10 to 190 is obtained by chlorinating an ethylene/alpha-olefin/non-conjugated diene copolymer rubber containing 5-vinyl-2-norbornene as the non-conjugated diene. The chlorinated rubber has excellent processability in roll milling, extrusion, etc.

3 Claims, 1 Drawing Sheet

E STANDARD

G STANDARD

F STANDARD

P STANDARD

CHLORINATED RUBBER

This is a division of application Ser. No. 133,425, filed 12/15/87, now U.S. Pat. No. 4,814,390, which is a division of Ser. No. 924,869, filed 10/30/86, now U.S. Pat. No. 4,764,562, issued 8/16/88.

BACKGROUND OF THE INVENTION

1. Field of the Invention

This invention relates to a chlorinated rubber having excellent moldability or processability obtained by chlorinating an ethylene/alpha-olefin/vinylnorbornene copolymer rubber.

2. Description of the Prior Art

It is known that chlorinated rubbers obtained by chlorinating ethylene/alpha-olefin/non-conjugated diene copolymer rubbers having a non-conjugated diene such as dicyclopentadiene and 5-ethylidene-2-norbornene as a copolymer component have excellent strength properties, weatherability, ozone resistance, oil resistance and fire retardancy (see, for example, Japanese Patent Publication Nos. 911/1974 and 2829/1974, and Japanese Laid-Open Patent Publication No. 67614/1982).

In spite of these excellent properties, these known chlorinated rubbers do not prove to have entirely satisfactory processability, and have the defect that in extrusion molding, the extrudate does not have a sufficiently smooth and flat surface and the appearance of the final product is markedly degraded.

SUMMARY OF THE INVENTION

It is an object of this invention to provide a chlorinated rubber which is excellent in various properties such as ozone resistance, weatherability, oil resistance, fire retardancy and strength properties and has a markedly improved processability.

The chlorinated rubber of this invention is obtained by chlorinating an ethylene/alpha-olefin/vinylnorbornene copolymer rubber, and has a chlorine content of 10 to 45% by weight (based on the weight of the chlorinated rubber) and a Mooney viscosity, $ML_{1+4}$ (121° C.), of 10 to 190. The ethylene/alpha-olefin/vinylnorbornene copolymer rubber to be chlorinated contains ethylene units and units from an alpha-olefin having 3 to 4 carbon atoms in a mole ratio of from 50:50 to 95:5, and contains 3 to 30 millimoles of 5-vinyl-2-norbornene units per 100 g of the ethylene units and the alpha-olefin units combined.

The present invention is based on the new finding that by chlorinating an ethylene/alpha-olefin/non-conjugated diene copolymer rubber containing 5-vinyl-2-norbornene as the non-conjugated diene, the resulting chlorinated rubber has markedly improved moldability.

Known chlorinated rubbers obtained by chlorinating copolymer rubbers containing only another non-conjugated diene such as dicyclopentadiene or ethylidenenorbornene as the diene component cannot have the excellent moldability of the chlorinated rubber of the invention. This will be shown clearly in examples given hereinbelow.

DETAILED DESCRIPTION OF THE INVENTION

(A) Ethylene/alpha-olefin/non-conjugated diene copolymer rubber

Figure 1:
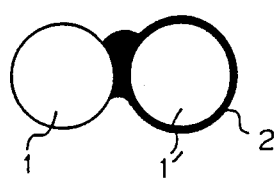
FIG. 1 shows evaluation standards for the processability of chlorinated rubber in roll milling.
Figure 1:
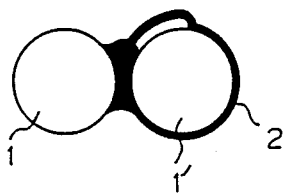
Figure 1:
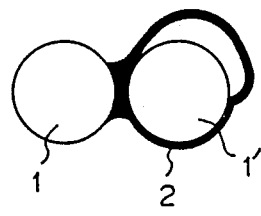
Figure 1:
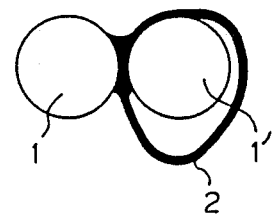

In the present invention, an ethylene/alpha-olefin/vinylnorbornene copolymer rubber is used as a base polymer for the chlorinated rubber.

The alpha-olefin used has 3 to 14 carbon atoms, and examples include propylene, 1-butene, 1-pentene, 1-hexene, 4-methyl-1-pentene, 1-octene and 1-decene. Alpha-olefins having 3 to 10 carbon atoms are preferred, and 1-butene and propylene are especially preferred.

In the copolymer rubber, the ethylene units and the alpha-olefin units are included in a mole ratio of from 50:50 to 95:5.

The non-conjugated diene component of the base copolymer rubber used in this invention is 5-vinyl-2-norbornene.

The important feature of the present invention is that an ethylene/alpha-olefin/non-conjugated diene copolymer rubber containing 5-vinyl-2-norbornene (to be sometimes referred to simply as vinylnorbornene) as the non-conjugated diene is chlorinated to obtain a chlorinated rubber having improved moldability or processability. When a copolymer rubber having another non-conjugated diene alone as the diene component is chlorinated, the processability of the chlorinated rubber is scarcely improved.

It is also important in this invention to use vinylnorbornene in an amount of 3 to 30 millimoles, particularly 5 to 25 millimoles, per 100 g of the ethylene units and the alpha-olefin units combined.

If the proportion of the vinylnorbornene copolymerized is smaller than the above-specified lower limit, it is difficult to achieve the desired improvement in moldability or processability. If, on the other hand, it is larger than the specified upper limit, the resulting copolymer rubber has too high a viscosity and is difficult to process.

The ethylene/alpha-olefin/vinylnorbornene copolymer rubber to be chlorinated may contain another known non-conjugated diene such as 5-ethylidene-2-norbornene, 1,4-hexadiene or dicyclopentadiene so long as it contains vinylnorbornene in the above-specified amount. The amount of the other non-conjugated diene, however, should be limited to not more than 100 millimoles per 100 g of the copolymer rubber. If its amount is larger, the heat aging resistance of the resulting copolymer rubber is highly to be reduced.

Preferably, the ethylene/alpha-olefin/vinylnorbornene copolymer rubber to be chlorinated has a number average molecular weight ($\overline{Mn}$) of $2.0 \times 10^4$ to $10.0 \times 10^4$, particularly $2.5 \times 10^4$ to $8.0 \times 10^4$, a molecular weight distribution ($\overline{Mw}/\overline{Mn}$) of 2.0 to 10.0, particularly 2.3 to 7.0, from the standpoint of strength and processability and a crystallinity, determined by X-ray diffraction, of not more than 20%.

This molecular weight distribution ($\overline{Mw}/\overline{Mn}$), Q value, is determined as follows:

A Q value, determined by a GPC (gel permeation chromatography) method, of the copolymer rubber of the present invention is desirably 6 or less, more desirably 2 to 6. A copolymer rubber having a Q value of 5 or less has an especially excellent vulcanizate strength and the copolymer rubber having a Q value of 2.5 to 5 has an especially good balance of the strength and the processing characteristics.

The Q value can be determined according to a method described in Takeuchi et al. "Gel Permeation Chromatography" issued from Maruzen, Japan as follows:

(1) A calibration curve of the correlation of a molecular weight M and EV (elution volume) is formed by measuring the molecular weights M and their GPC counts of standard polystyrenes having known molecular weights (mono-dispersed polystyrene manufactured by TOYO SODA K.K.) at a concentration of 0.02% by weight.

(2) A GPC chromatogram of samples is obtained by a GPC measurement, and the number-average molecular weight $M_n$, weight-average molecular weight $M_w$ and a Q value are determined, as polystyrene converted values, from the calibration curve obtained in (1) above.

$$M_w = \frac{\Sigma M_i^2 N_i}{\Sigma N_i}$$

$$M_n = \frac{\Sigma M_i N_i}{\Sigma N_i}$$

$$Q = M_w/M_n$$

The preparation conditions of the samples and the GPC analyzing conditions are as follows:

Sample preparation (a) A sample is taken at a concentration of 0.04% by weight, together with o-dichlorobenzene solvent, in an Erlenmeyer flask.

(b) An anti-oxidant, 2,6-di-tert-butyl-p-cresol is added to the Erlenmeyer flask containing the sample in such an amount that the content of the anti-oxidant becomes 0.1% by weight based on the polymer solution.

(c) The Erlenmeyer flask was heated, while stirring, at a temperature of 140° C. for about 30 minutes to form the solution.

(d) The polymer solution is filtered at a temperaure of 135° C. to 140° C. through a 1 μm millipore filter.

(e) The filtrate was subjected to a GPC analyzer.

GPC analyzing conditions (a) Device: Model 200 manufactured by Waters Co., Ltd.

(b) Column: Type S (Mixed Type) manufactured by Toyo Soda K.K.

(c) Sample amount: 2 ml (d) Temperature: 135° C.

(e) Flow rate: 1 ml/min (f) Number of the total theoretical plate of column: $2 \times 10^4$ to $4 \times 10^4$ (measured by acetone)

The ethylene/alpha-olefin/vinylnorbornene copolymer rubber can be produced by a known method. For example, it may be produced by copolymerizing ethylene, an alphaolefin having 3 to 14 carbon atoms and 5-vinyl-2-norbornene optionally with another non-conjugated diene in a reaction medium in the presence of a Ziegler catalyst comprising, for example, a soluble vanadium compound and an organoaluminum compound while supplying a hydrogen gas or the like as a molecular weight controlling agent. An aliphatic hydrocarbon such as pentane, hexane, heptane, octane or kerosene, an alicyclic hydrocarbon such as cyclohexane, an aromatic hydrocarbon such as benzene, toluene or xylene and a halogenated hydrocarbon such as chlorobenzene, carbon tetrachloride, tetrachloroethylene, trichloroethylene, ethyl chloride, methylene chloride or dichloroethane may be used as the reaction medium either singly or as a mixture. Examples of the soluble vanadium compound are vanadium tetrachloride, vanadyl trichloride, vanadium triacetylacetonate, vanadyl acetylacetonate, vanadyl trialkoxides $VO(OR)_3$ where R represents an aliphatic hydrocarbon group, and halogenated vanadyl alkoxides $VO(OR)_n X_{3-n}$ wherein R represents an aliphatic hydrocarbon group having carbon atoms 1-10, X represents a halogen atom, and n is a number represented by $0 < n < 3$. They may be used either singly or as a mixture. The organoaluminum compound may, for example, be a compound represented by the general formula $R_m AlX_{3-m}$ wherein R represents an aliphatic hydrocarbon group having carbon atoms 1-10, X represents a halogen atom, and m is a number represented by $1 < m < 3$. Specific examples are triethyl aluminum, diethyl aluminum chloride, ethyl aluminum sesquichloride and ethyl aluminum dichloride. They may be used either singly or as a mixture.

(B) Chlorination

Chlorination of the ethylene/alpha-olefin/vinylnorbornene copolymer is carried out, for example, by pulverizing the copolymer into pellets, dispersing the pellets in water, and then bringing them into contact with molecular chlorine usually at a temperature of about 70° to 90° C., or by dissolving the copolymer rubber in a solvent stable to chlorine (such as carbon tetrachloride or tetrachloroethylene) to form a uniform solution, and bringing the solution into contact with molecular chlorine.

As is the case with the prior art, when chlorination is carried out by using molecular chlorine, the rate of the chlorination reaction can be greatly increased by light irradiation.

After the chlorination reaction, the product is usually worked up in the following manner. When chlorination is conducted in aqueous dispersion, the resulting reaction mixture is washed with water to separate the chlorinated rubber from molecular chlorine, and the chlorinated rubber is dried. In the case of performing chlorination in solution, the resulting reaction solution is put in an excess of a poor solvent for the chlorinated rubber, such as methanol. The resulting precipitate is collected by filtration, washed with the above solvent and then dried.

The degree of chlorination may be regulated by properly selecting the amount of molecular chlorine or another chlorinating agent, the reaction time, the reaction temperature, etc. The chlorine content of the chlorinated rubber is adjusted to 10 to 45% by weight, preferably 10 to 35% by weight, based on the weight of the chlorinated rubber.

Preferably, about 0.05 to 2 parts by weight, per 100 parts by weight of the chlorinated rubber, of each of a hydrochloric acid absorbing agent, an antioxidant and a metal inactivating agent is added to the chlorinated rubber.

Examples of the hydrochloric acid absorbing agent are organic acid salts of metals of Group IIA of the periodic table, such as magnesium stearate, calcium stearate, manasseite, hydrotalcite, epoxidized soybean oil and epoxy-type CHl absorbing agents. Examples of the antioxidant include di-t-butylhydroxytoluene, tetrakis(methylene(3,5-di-t-butyl-4-hydroxy)hydrocinnamate)methane, D,L-alpha-tocopherol, phenylbetanaphthylamine, triphenylmethane and 1,4-benzoquinone. Examples of the metal inactivating agent are tris(- nonylphenyl) phosphite, isopropyl citrate, pentaerythritol and tetrakis(2,4-di-t-butylphenyl) 4,4'-biphenylenediphosphite.

These additives produce a marked effect in stabilizing the color of the chlorinated rubber and preventing its gellation.

If the chlorine content of the chlorinated rubber is less than 10% by weight based on the weight of the chlorinated rubber, the effect of imparting oil resistance, adhesion and fire retardancy by chlorination is not fully exhibited. On the other hand, if the chlorine content of the chlorinated rubber exceeds 45% by weight based on the weight of chlorinated rubber, the melt-flow characteristics of the chlorinated rubber are degraded, and its moldability or processability is reduced. At the same time, the chlorinated rubber is difficult to blend uniformly with other rubbers or resins.

(C) Chlorinated rubber

The resulting chlorinated rubber of this invention desirably has a Mooney viscosity, $ML_{1+4}$ (121° C.), of 10 to 190, particularly 20 to 150. If the Mooney viscosity is lower than the specified lower limit, the strength of the chlorinated rubber is insufficient. If it is higher than the specified upper limit, the same defect as in the case of the chlorine content exceeding 45% by weight is caused.

The chlorinated rubber provided by this invention, like known chlorinated ethylene/alpha-olefin copolymer rubbers or chlorinated ethylene/alpha-olefin/nonconjugated copolymer rubbers, have excellent strength properties, weatherability, ozone resistance, oil resistance, fire retardancy and adhesion as well as excellent processability. In particular, since by extrusion molding, an extrudate having a sufficiently flat and smooth surface can be formed, the resulting product has an excellent appearance as merchandize.

In the unvulcanized state, the chlorinated rubber of this invention can be used as a thermoplastic rubber in various applications, for example, interior and exterior automotive parts, industrial goods such as packings, linings, belts, hose and protective coatings, insulating and covering materials such as entrance wires and electrical wires, cover rubbers for gaskets, building materials such as floor tiles, and rubber-lined cloths. For molding, ordinary molding machines for thermoplastic resins can be used.

Since the unvulcanized chlorinated rubber has good flexibility and excellent melt-flow characteristics, it can be easily blended with various rubbers. Thus, the chlorinated rubber of this invention in the unvulcanized state can be effectively used as an impact strength improver for vinyl chloride resins, polypropylene and styrene resins such as polystyrene, AS resin and ABS resin, a non-bleeding plasticizer for semirigid to flexible vinyl chloride resins, and as a fire retarding agent for polyolefins such as polyethylene and polypropylene.

(D) Vulcanized chlorinated rubber

The chlorinated rubber of this invention best exhibits its properties when vulcanized.

As in vulcanizing general rubbers, a vulcanized product of the chlorinated rubber of the invention is produced by first preparing an unvulcanized rubber compound from the chlorinated rubber, molding the compound into the desired shape, and then vulcanizing the molded article by heating in the presence of a vulcanizer, or by irradiation of electron beams.

The vulcanizer may, for example, be a metal salt, a sulfur-containing compound, or an organic peroxide, or a combination of these.

Examples of the metal salt are magnesium oxide, zinc salts of higher fatty acids such as zinc stearate and zinc oleate, red lead and litharge. The amount of the metal salt to be incorporated is usually about 3 to 15 parts by weight, preferably about 5 to 10 parts by weight, per 100 parts by weight of the chlorinated rubber.

Examples of the sulfur-containing compound used in vulcanizing the chlorinated rubber include sulfur, sulfur chloride, sulfur dichloride, morpholine disulfide, alkylphenol disulfides, tetramethylthiuram disulfide and selenium dimethyldithiocarbamate. The amount of the sulfur-containing compound to be incorporated is usually about 0.1 to 10 parts by weight, preferably about 0.5 to 5 parts by weight, per 100 parts by weight of the chlorinated rubber.

When the vulcanizer is the sulfur-containing compound is, it is preferably used in combination with a vulcanization accelerator. Examples of the vulcanization accelerator include thiazole compounds such as N-cyclohexyl-3-benzothiazole sulfenamide, N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide; guanidine compounds such as diphenylguanidine, triphenylguanidine, diortho-tolylguanidine, ortho-tolyl-guanide and diphenylguanidine phthlate; aldehyde-amine or aldehyde-ammonia systems such as an acetaldehyde/aniline reaction product, a butyraldehyde/aniline condensate, hexamethylenetetramine and acetaldehyde-ammonia; imidazoline compounds such as 2-mercaptoimidazoline; thiourea compounds such as thiocarbanilide, diethylthiourea, dibutylthiourea, trimethylthiourea and di-orthotolylthiourea; thiuram compounds such as tetramethylthiuram monosulfide, tetramethylthiuram disulfide, tetraethylthiuram disulfide, tetrabutylthiuram disulfide and pentamethylenethiuram tetrasulfide; dithioacid salts such as zinc dimethyldithocarbamate, zinc diethylthiocarbamate, zic di-n-butyldithiocarbamate, zinc ethylphenyldithiocarbamate, zinc butylphenyldithiocarbamate, sodium dimethyldithiocarbamate, selenium dimethyldithiocarbamate, tellurium diethyldithiocarbamate; and xanthate compounds such as zinc dibutylxanthogenate. The amount of the vulcanization accelerator used is usually 0.1 to 20 parts by weight, preferably 0.2 to 10 parts by weight, per 100 parts by weight of the chlorinated rubber.

To obtain rubber which can withstand use under very severe conditions, it is desirable to use a triazine compound represented by the following general formula:

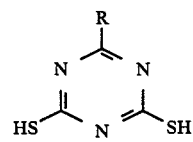

wherein R is $R^1R^2N-$, $R^1O-$, $R^1S$ or

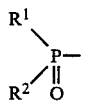

in which $R^1$ and $R^2$ each represents a hydrogen atom, a $C_1$-$C_{20}$ alkyl group, a $C_6$-$C_{20}$ aryl group, a substituted $C_1$-$C_{20}$ alkyl group or a substituted $C_6$-$C_{20}$ aryl group,
as the vulcanizer. Example of the triazine compounds include 2,4,6-trimercaptotriazine, 2-dibutylamino-4,6-dimercaptotriazine, and 2-phenylamino-4,6-dimercaptotriazine. The triazine compound is added in an amount of $1.0 \times 10^{-3}$ to $2.0 \times 10^{-2}$ mole, preferably $2.5 \times 10^{-3}$ to $1.0 \times 10^{-2}$ mole, per 100 g of the chlorinated rubber.

Furthermore, as a vulcanization aid, an organic base having an acid dissociation constant (pKa) of at least 7, or a compound capable of generating the organic base is used in an amount of $5 \times 10^{-4}$ to $2 \times 10^{-2}$ mole, preferably $1 \times 10^{-3}$ to $1 \times 10^{-2}$ mole, per 100 parts by weight of the chlorinated rubber. Examples of the vulcanization aid include 1,8-diaza-bicyclo(5,4,0)undecene-7, laurylamine, benzylamine, dibenzylamine, N-methylmorpholine, dicyclohexylamine, zinc dibutyldithiocarbamate, piperidine pentamethylenedithiocarbamate, N-cyclohexyl-2-benzothiazolyl sulfonamide, dipentamethylenethiuram tetrasulfide, tetramethylthiuram disulfide, and onium salts such as tetramethylphosphonium iodide, tetramethylphosphonium iodide, tetramethylammonium chloride, tetrabutylphosphonium bromide and tetrabutylammonium bromide.

To cope with various rubber processing steps, it is recommended to add a compound having an oxymethylene structure and an antiscorching agent.

Examples of the compound having an oxyethylene structure include ethylene glycol, polyethylene glycol, propylene glycol, and polypropylene glycol. Usually, this compound is used in an amount of 2 to 10 parts by weight, preferably 3 to 5 parts by weight, per 100 parts by weight of the chlorinated rubber.

Known anti-scorching agents may be used. Examples are maleic anhydride, thioimide-type compounds and sulfonamide-type compounds. The antiscorching agent is added usually in an amount of 0.2 to 5.0 parts by weight, preferably 0.3 to 3 parts by weight.

Examples of the organic peroxide used in vulcanizing the chlorinated rubber of this invention include dicumyl peroxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, di-t-butyl peroxide, di-t-butylperoxy-3,3,5-trimethyl-cyclohexane, and t-butyl hydroperoxide. Of these, dicumyl peroxide, di-t-butyl peroxide and di-t-butylperoxy-3,3,5-trimethylcyclohexane are preferred. The amount of the organic peroxide used is usually $3 \times 10^{-4}$ to $5 \times 10^{-2}$ mole, preferably $1 \times 10^{-3}$ to $3 \times 10^{-2}$ mole, per 100 g of the chlorinated rubber.

When the vulcanizer is the organic peroxide, it is preferably used in combination with a vulcanization aid. Examples of the vulcanization aid for this purpose are sulfur, quinone dioxime compounds such as p-quinonedioxime, methacrylate compounds such as polyethylene glycol dimethacrylate, allyl compounds such as diallyl phthalate and triallyl cyanurate, maleimide compounds and divinylbenzene. The vulcanization aid is used in an amount of ½ to 2 moles, preferably about 1 mole, per mole of the organic peroxide.

As in conventional rubbers, the use of an antioxidant can prolong the service life of vulcanized products of the chlorinated rubber of the invention. Examples of the antioxidant are aromatic secondary amines such as phenylnaphthylamine and N,N'-di-2-naphthyl-p-phenylenediamine, phenol-type stabilizers such as dibutylhydroxytoluene and tetrakis(methylene(3,5-di-t-butyl-4-hydroxy)hydrocinnamate)methane, thio ether-type stabilizers such as (2-methyl-4-(3-n-alkylthiopropionyloxy)-5-t-butylphenyl)sulfide, and dithiocarbamate-type stabilizers such as nickel dibutyldithiocarbamate. They may be used either singly or as a mixture. The amount of the antioxidant is usually 0.1 to 5.0 parts by weight, preferably 0.5 to 3.0 parts by weight, per 100 parts by weight of the chlorinated rubber.

In the case of using electron beams without using a vulcanizer, electron beams having an energy of 0.1 to 10 MeV (megaelectron volts), preferably 0.3 to 2.0 MeV, are irradiated onto a molded unvulcanized rubber compound so that the absorption dose will become 0.5 to 35 Mrads (megarads), preferably 0.5 to 10 Mrads. If desired, the electron beam irradiation may be carried out in the presence of the vulcanization aid used in combination with the organic peroxide vulcanizer. The amount of the vulcanization aid is $1 \times 10^{-4}$ to $1 \times 10^{-1}$ mole, preferably $1 \times 10^{-3}$ to $3 \times 10^{-2}$ mole, per 100 g of the chlorinated rubber.

A reinforcing agent, a filler, a softening agent, a fire retarding agent, a processing aid, etc. may optionally be incorporated in the chlorinated rubber compound to be vulcanized.

Examples of the reinforcing agent are various carbon blacks such as SRF, GPF, FEF, HAF, ISAF, SAF, FT and MT, and finely divided silica. The filler may, for example, be calcium carbonate, talc, or clay. The reinforcing agent and the filler are used each in an amount of usually not more than 300 parts by weight, preferably not more than 200 parts by weight, per 100 parts by weight of the chlorinated rubber.

The chlorinated rubber provided by this invention exhibits excellent moldability and strength properties even when a cheap white filler is used. Hence, rubber products of a bright color can be easily obtained. This property is markedly exhibited in extruded products such as gaskets, hose, rubber-coated electric wires and seal sponges, and the chlorinated rubber of this invention can meet the need of providing rubber products of a bright color. As required, various commercial coloring agents can be added. When an inorganic pigment such as titanium white is added as the coloring agent, its amount is usually 1 to 50 parts by weight, preferably 5 to 30 parts by weight, per 100 parts by weight of the chlorinated rubber. If an organic pigment such as Naphthol Green B (a product of Chugai Chemical Co., Ltd.) is added, its amount is usually 0.5 to 10 parts by weight, preferably 2 to 8 parts by weight, per 100 parts by weight of the chlorinated rubber.

Examples of the softening agent include petroleum-type substances such as process oils, lubricant oils, paraffins, liquid paraffin, petroleum asphalt and Vaseline, coal tars such as coal tar and coal tar pitch, fatty oils such as castor oil, linseed oil, rapeseed oil and coconut oil, waxes such as tall oil, factice, beeswax, carnauba wax and lanolin, fatty acids or their metal salts such as ricinoleic acid, palmitic acid, barium stearate and calcium stearate, synthetic polymeric substances such as petroleum resins, atactic polypropylene and coumarone-indene resin, and ester-type plasticizers such as dioctyl phthalate and dioctyl adipate. The softening agent is used in an amount of not more than about 200 parts by weight, preferably not more than about 100 parts by weight, per 10 parts by weight of the chlorinated rubber.

Fire retardants normally used in plastics and rubbers can be employed in the present invention. Examples include phosphorus-containing fire retardants such as triphenyl phosphate; halogen-containing fire retardants such as decabromodiphenyl ether, chlorinated polyethylene and commercial halogen-containing fire retardants such as Dechloranplus 515 (a product of Marusho Sangyo K.K.), Pulanerone DB-100 (a product of Mitsui Toatsu Fine Inc.) and Bromrite BR-128F (a product of Hitachi Chemical Co., Ltd.); antimony trioxide; inorganic fire retardants such as aluminum hydroxide sold under the tradename Hydilite H-40; and mixtures of above fire retardants. These fire retardants are selected properly according to the end usage. The amount of the fire retardant used is usually not more than 50 parts by weight; preferably not more than 30 parts by weight, per 100 parts by weight of the chlorinated rubber.

Processing aids used in processing ordinary rubbers can be used in this invention. Examples are ricinoleic acid, stearic acid, palmitic acid, lauric acid, barium stearate, calcium stearate, zinc stearate, esters of the above acids, higher fatty acids and salts and esters of the higher fatty acids. The amount of the processing aid is usually up to about 10 parts by weight, preferably about 1 to 5 parts by weight, per 100 parts by weight of the chlorinated rubber.

The rubber compound is prepared, for example, by the following method. The chlorinated rubber and additives such as a reinforcing agent, a filler and a softening agent are kneaded by using a mixer such as a Banbury mixer at a temperature of about 80° to 170° C. for about 3 to 10 minutes, and then the vulcanizer and vulcanization aid are additionally mixed by using a roll such as an open roll. The mixture is kneaded at a roll temperature of about 40° to 80° C. for about 5 to 30 minutes and sheeted to form a ribbon-like or sheet-like rubber compound. Alternatively, a pelletized rubber compound may be prepared by directly feeding the chlorinated rubber and the compounding chemicals into an extruder heated at about 80° to 100° C. and kneading and extruding the mixture with a residence time of about 0.5 to 5 minutes.

The unvulcanized rubber compound so prepared is molded into the desired shape by an extruder, a calender roll, a press, etc., and heating the molded product at a temperature of about 150° to 270° C. for about 1 to 30 minutes simultaneously with the molding, or after molding in a vulcanization vessel.

The vulcanization vessel may, for example, be a steam vulcanization autoclave, a hot air heating vessel, a glass beads fluidized bed, a molten salt vulcanization vessel, and a microwave vulcanization vessel either singly or in combination.

The vulcanized product as such is useful as an electrical insulating material, an automobile industrial part, an industrial rubber product, a construction and building material and a rubber-lined cloth.

As the electrical insulating material, it is specifically used, for example, as caps in the vicinity of an automobile engine such as a plug cap, an ignition cap, or a distributor cap, a condenser cap, an insulating layer cylindrically covering the conducting part of electrical wires such as ship electrical wires and an automobile ignition cables, and a cable joint cover.

As the automobile parts, it can be used as hoses such as a radiator hose and a fuel hose, automobile exterior parts such as a bumper, a bumper filler, a bumper strip, a bumper side guard, an over rider and a side protector, various weather strips, a boot, a ball joint seal, and various antivibration rubbers.

As the industrial rubber products, it can be used as a roll, a packing, a lining or a belt.

As the construction and building material, it can be used as a roofing sheet, a heat-resistant belt, a gasket for building and a high way joint seal.

As the rubber-lined sheet, it can be used as a waterproof cloth, a canvas and a leasure sheet.

(E) Foamed article

A vulcanizable and foamable chlorinated rubber composition may be prepared by incorporating a chemical blowing agent and as required, a foaming aid in the chlorinated rubber of the invention prior to vulcanization. A crosslinked foamed chlorinated rubber can be obtained by crosslinking and foaming this vulcanizable and foamable chlorinated rubber composition. Such a vulcanized and foamed rubber can be used as a sponge rubber, a heat insulating material, a cushioning material, a sealing material, an antiacoustic material and an electrical insulating material.

Examples of the chemical blowing agent include inorganic blowing agents such as sodium hydrogen carbonate, ammonium hydrogen carbonate, ammonium carbonate and ammonium nitrite; nitroso compounds such as N,N'-dimethyl-N,N'-dinitroso terephthalamide and N,N'-dinitrosopentamethylenetetramine; azo compounds such as azidicarbonamide, azobisisobutyronitrile, azocyclohexylnitrile, azodiaminobenzene and barium azodicarboxylate; sulfonyl hydrazide compounds such as benzenesulfonyl hydrazide, toluenesulfonyl hydrazide, p,p'-hydroxybis(benzenesulfonyl hydrazide) and diphenylsulfone-3,3'-disulfonyl hydrazide; and azide compounds such as calcium azide, 4,4'-diphenyldisulfonyl azide and p-toluenesulfonyl azide. The nitro compound, azo compounds and azide compounds are preferred.

The chemical blowing agent is incorporated in an amount of usually about 0.5 to 30 parts by weight, preferably about 1 to 20 parts by weight, per 100 parts by weight of the chlorinated rubber. Generally, a foamed article having an apparent density of about 0.03 to 0.9 is formed.

The foaming aid that can be used together with the chemical blowing agent may include, for example, organic acids such as salicylic acid, phthalic acid and stearic acid, urea, and urea derivatives. The foaming aid acts to lower the decomposition temperature of the blowing agent, accelerate the decomposition, and make the cells uniform.

The suitable amount of the foaming aid is 5 to 200 parts by weight, preferably 10 to 100 parts by weight, per 100 parts of the chemical blowing agent.

The following examples illustrate the present invention more specifically.

EXAMPLE 1

An ethylene/1-butene/5-vinyl-2-norbornene copolymer rubber was prepared by a known polymerization method. Infrared spectroscopy showed that the copolymer rubber comprised ethylene units and 1-butene units in a mole ratio of 90:10, and $1.5 \times 10^{-2}$ mole, per 100 g of the copolymer rubber, of 5-vinyl-2-norbornene units. The copolymer had a Mooney viscosity, $ML_{1+4}$ (100° C.), measured by a Mooney viscometer (MSV-200, a product of Shimazu Seisakusho) in accordance with JIS K6300, of 20.

Fifty grams of the copolymer rubber was dissolved in carbon tetrachloride, and the solution was fed into a 3-liter glass reactor equipped with a stirrer, a thermometer and a chlorine gas introducing tube. While maintaining a temperature of 60° C., light from a 20W daylight color fluorescent lamp was irradiated externally of the reactor and simultaneously, chlorine gas was introduced into the reactor at a rate of 2.0 g/min. Chlorination was carried out for 50 minutes. Nitrogen gas was passed into the reactor to remove the excess of the chlorine gas.

To the solution were added 0.3 g of di-t-butyl hydroxytoluene and 0.3 g of calcium stearate. The mixture was concentrated by an evaporator and further dried fully in a vacuum drier at room temperature to remove the solvent.

The properties of the chlorinated rubber were measured as follows:

Chlorine content: Bomb burning method

Mooney viscosity ($ML_{1+4}$ (121° C.)): Mooney viscometer (Model MSV-200 made by Shimazu Seisakusho), JIS K6300

The chlorinated rubber had a chlorine content of 25% by weight based on the weight of the chlorinated rubber and a Mooney viscosity, $ML_{1+4}$ (121° C.), of 55.

In the following Examples and Comparative Examples, the chlorine content is based on the weight of the chlorinated rubber.

The chlorinated rubber was compounded in accordance with the following recipe (parts by weight).

| | |
|---|---|
| Chlorinated rubber | 100.0 |
| Stearic acid | 1.0 |
| Magnesium oxide[1] | 7.0 |
| Talc[2] | 60.0 |
| Process oil[3] | 10.0 |
| 2-Dibutylamino-4,6-[4] dimercaptotriazine | 2.0 |
| Piperidine pentamethylenedithio-[5] carbamate | 2.0 |

[1]Kyowa Mag 150, a tradename for a product of Kyowa Chemical Co., Ltd.
[2]Mistron Paper Talc, a tradename for a product of Sierra Talc Co., Ltd.
[3]Diana Process Oil NS-220, a tradename for a product of Idemitsu Industry Co., Ltd.
[4]ZISNET-DB, a tradename for a product of Sankyo Chemical Co., Ltd.
[5]Nocceler PPD, a tradename for a product of Ouchi Shinko Co., Ltd.

The chlorinated rubber, stearic acid, magnesia, Mistron Paper Talc and the process oil were kneaded for 6 minutes in a 4.3-liter Banbury mixer (Model DCC, made by Kobe Steel, Ltd.) and the mixture was left to stand at room temperature for 1 day. To the kneaded mixture were added 2-dibutylamino-4,6-dimercaptotriazine, and piperidine pentamethylenedithiocarbamate, and the mixture was kneaded by a 14-inch open roll mill. The surface temperature of the roll was 60° C. at the front roll and 70° C. at the rear roll. The rotating speed was 16 rpm at the front roll, and 18 rpm at the rear roll. The roll processability of the kneaded mixture was evaluated by the standards shown in FIG. 1. In FIG. 1, the reference numeral 1 represents the front roll; 1', the rear roll; and 2, the chlorinated rubber.

Evaluation
E: Excellent
G: Good
F: Fair
P: Poor

The resulting rubber compound was fed into an extruder (cylinder diameter 50 mm$\phi$; L/D=14; compression ratio 1.1; Garbey die) and extruded at an extruding temperature of 100° C. at a take-up speed of 5 m/min. The appearance of the surface of the resulting strand, and as a measure of extrusion processability, the surface of the extruded strand was evaluated on a scale of five grades as follows:

5 ... No surface unevenness, and good gloss
4 ... Scarcely any surface unevenness, and no gloss
3 ... Slight surface unevenness, and no gloss
2 ... Surface unevenness, and no gloss
1 ... Large unevenness on the surface, and no gloss at all The rubber compound was press-cured at 160° C. for 20 minutes to form a vulcanized rubber sheet having a thickness of 2 mm. The tensile strength and spring hardness of the sheet were measured in accordance with the methods of JIS K-6301. The results are shown in Table 1.

EXAMPLE 2

An ethylene/1-butene/5-vinyl-2-norbornene copolymer rubber which had a Mooney viscosity, $ML_{1+4}$ (100° C.), of 22 and contained ethylene units and 1-butene units in a mole ratio of 90:10 and $0.4 \times 10^{-2}$ mole, per 100 g of the copolymer rubber, of 5-vinyl-2-norbornene units was produced by a known polymerization method.

The copolymer rubber was chlorinated by the same method as in Example 1 to give a chlorinated rubber having a chlorine content of 25% by weight and a Mooney viscosity, $ML_{1+4}$ (121° C.), of 57.

The chlorinated rubber was compounded, and vulcanized in the same way as in Example 1. The results are shown in Table 1.

EXAMPLE 3

An ethylene/1-butene-5-vinyl-2-norbornene copolymer rubber which had a Mooney viscosity, $ML_{1+4}$ (100° C.), of 21 and contained ethylene units and 1-butene units in a mole ratio of 90:10 and $2.5 \times 10^{-2}$ mole, per 100 g of the copolymer rubber, of 5-vinyl-2-norbornene units was produced by a known polymerization method.

The copolymer rubber was chlorinated by the same method as in Example 1 to give a chlorinated rubber having a chlorine content of 25% by weight and a Mooney viscosity, $ML_{1+4}$ (121° C.), of 54.

The chlorinated rubber was compounded, vulcanized and evaluated in the same way as in Example 1. The results are shown in Table 1.

Comparative Example 1

An ethylene/1-butene copolymer rubber having a Mooney viscosity, $ML_{1+4}$ (100° C.), of 19 and containing ethylene units and 1-butene units in a mole ratio of 90:10 was produced by a known method.

The copolymer rubber was chlorinated in the same way as in Example 1 to give a chlorinated rubber having a chlorine content of 24% by weight and a Mooney viscosity, $ML_{1+4}$ (121° C.), of 53.

The chlorinated rubber was compounded, vulcanized and evaluated in the same way as in Example 1. The results are shown in Table 1.

Comparative Example 2

An ethylene/1-butene/5-ethylidene-2-norbornene copolymer rubber which had a Mooney viscosity, $ML_{1+4}(100°\ C.)$, of 21 and contained ethylene units and 1-butene units in a mole ratio of 90:10 and $1.5\times 10^{-2}$ mole, per 100 g of the copolymer rubber, of 5-ethylidene-2-norbornene was produced by a known polymerization method.

The copolymer rubber was chlorinated in the same way as in Example 1 to give a chlorinated rubber having a chlorine content of 25% by weight and a Mooney viscosity, $ML_{1+4}$ (121° C.), of 55.

The chlorinated rubber was compounded, vulcanized and evaluated by the same method as in Example 1. The results are shown in Table 1.

Comparative Example 3

An ethylene/1-butene/dicyclopentadiene copolymer rubber which had a Mooney viscosity, $ML_{1+4}$ (100° C.), of 22 and contained ethylene unit and 1-butene units in a mole ratio of 90:10 and $1.5\times 10^{-2}$ mole, per 100 g of the chlorinated copolymer, of dicyclopentadiene units was produced by a known method.

The copolymer rubber was chlorinated in the same way as in Example 1 to give a chlorinated rubber having a chlorine content of 25% by weight and a Mooney viscosity, $ML_{1+4}$ (121° C.), of 58.

The chlorinated rubber was compounded, vulcanized and evaluated in the same way as in Example 1. The results are shown in Table 1.

Comparative Example 4

An ethylene/1-butene/1,4-hexadiene copolymer rubber which had a Mooney viscosity, $ML_{1+4}(100°\ C.)$, of 23 and contained ethylene units and 1-butene units in a mole ratio of 90:10 and $1.5\times 10^{-2}$ mole, per 100 g of the copolymer rubber, of 1,4-hexadiene units was produced by a known polymerization method.

The copolymer rubber was chlorinated in the same way as in Example 1 to give a chlorinated rubber having a chlorine content of 25% by weight and a Mooney viscosity, $ML_{1+4}$ (121° C.), of 56.

The chlorinated rubber was compounded, vulcanized and evaluated in the same way as in Example 1. The results are shown in Table 1.

EXAMPLE 4

An ethylene/1-butene/5-vinyl-2-norbornene copolymer rubber which had a Mooney viscosity, $ML_{1+4}$ (100° C.), of 20 and contained ethylene units and 1-butene units in a mole ratio of 90:10 and $1.5\times 10^{-2}$ mole, per 100 g of the copolymer rubber, of 5-vinyl-2-norbornene units was produced by a known polymerization method.

The copolymer rubber was chlorinated by the same method as in Example 1 except that the chlorination reaction time was changed to 20 minutes to give a chlorinated rubber having a chlorine content of 15% by weight and a Mooney viscosity, $ML_{1+4}$ (121° C.), of 29.

The chlorinated rubber was compounded, vulcanized and evaluated by the same method as in Example 1. The results are shown in Table 1.

EXAMPLE 5

An ethylene/1-butene/5-vinyl-2-norbornene copolymer rubber which had a Mooney viscosity, $ML_{1+4}$ (100° C.), of 20 and contained ethylene units and 1-butene units in a mole ratio of 90:10 and $1.5\times 10^{-2}$ mole, per 100 g of the copolymer rubber, of 5-vinyl-2-norbornene units was produced by a known polymerization method.

The copolymer rubber was chlorinated in the same way as in Example 1 except that the chlorination reaction time was changed to 110 minutes. The resulting chlorinated rubber had a chlorine content of 35% by weight and a Mooney viscosity, $ML_{1+4}$ (121° C.), of 105.

The chlorinated rubber was compounded, vulcanized and evaluated in the same way as in Example 1. The results are shown in Table 1.

EXAMPLE 6

An ethylene/1-butene/5-vinyl-2-norbornene copolymer rubber was produced by a known polymerization method which had a Mooney viscosity, $ML_{1+4}$ (100° C.), of 5 and contained ethylene units and 1-butene units in a mole ratio of 90:10 and $1.5\times 10^{-2}$ mole, per 100 g of the copolymer rubber, of 5-vinyl-2-norbornene units was produced by a known polymerization method.

The copolymer rubber was chlorinated in the same way as in Example 1 to give a chlorinated rubber having a chlorine content of 25% by weight and a Mooney viscosity, $ML_{1+4}$ (121° C.), of 20.

The chlorinated rubber was compounded, vulcanized and evaluated in the same way as in Example 1. The results are shown in Table 1.

EXAMPLE 7

An ethylene/1-butene/5-vinyl-2-norbornene copolymer rubber which had a Mooney viscosity, $ML_{1+4}$ (100° C.), of 80 and $1.5\times 10^{-2}$ mole, per 100 g of the copolymer rubber, of 80 and contained ethylene units and 1-butene units in a mole ratio of 90:10 and $1.5\times 10^{-2}$ mole, per 100 g of the copolymer, of 5-vinyl-2-norbornene units was produced by a known polymerization method.

The copolymer was chlorinated in the same way as in Example 1 to give a chlorinated rubber having a chlorine content of 25% by weight of a Mooney viscosity, $ML_{1+4}$ (121° C.), of 160.

The chlorinated rubber was compounded, vulcanized and evaluated in the same way as in Example 1. The results are shown in Table 1.

EXAMPLE 8

An ethylene/1-butene/5-vinyl-2-norbornene/5-ethylidene-2-norbornene copolymer rubber which had a Mooney viscosity, $ML_{1+4}$ (100° C.), of 23 and contained ethylene units and 1-butene units in a mole ratio of 90:10 and $1.5\times 10^{-2}$ mole of 5-vinyl-2-norbornene units and $1.0\times 10^{-2}$ mole of 5-ethylidene-2-norbornene units per 100 g of the copolymer rubber was produced by a known polymerization method.

The copolymer rubber was chlorinated in the same way as in Example 1 to give a chlorinated rubber having a chlorine content of 25% by weight and a Mooney viscosity, $ML_{1+4}$ (121° C.), of 50.

The chlorinated rubber was compounded, vulcanized and evaluated in the same way as in Example 1. The results are shown in Table 1.

EXAMPLE 9

An ethylene/propylene/5-vinyl-2-norbornene copolymer rubber which had a Mooney viscosity, $ML_{1+4}$ (100° C.), of 23 and contained ethylene units and propylene units in a mole ratio of 80:20 and $1.5 \times 10^{-2}$ mole, per 100 g of the copolymer rubber, of 5-vinyl-2-norbornene units was produced by a known polymerization method.

The copolymer rubber was chlorinated in the same way as in Example 1 to give a chlorinated rubber having a chlorine content of 25% by weight and a Mooney viscosity, $ML_{1+4}$ (121° C.), of 56.

The chorinated rubber was compounded, vulcanized and evaluated in the same way as in Example 1. The results are shown in Table 1.

EXAMPLE 10

An ethylene/propylene/5-vinyl-2-norbornene copolymer rubber which had a Mooney viscosity, $ML_{1+4}$ (100° C.), of 25 and contained ethylene units and propylene units in a mole ratio of 80:20 and $0.4 \times 10^{-2}$ mole, per 100 g of the copolymer rubber, of 5-vinyl-2-norbornene units was produced by a known polymerization method.

The copolymer rubber was chlorinated in the same way as in Example 1 to give a chlorinated rubber having a chlorine content of 25% by weight and a Mooney viscosity, $ML_{1+4}$ (121° C.), of 57.

The chlorinated rubber was compounded, vulcanized and evaluated in the same way as in Example 1. The results are shown in Table 1.

EXAMPLE 11

An ethylene/propylene/5-vinyl-2-norbornene copolymer rubber which had a Mooney viscosity, $ML_{1+4}$ (100° C.), of 23 and contained ethylene units and propylene units in a mole ratio of 80:20 and $2.5 \times 10^{-2}$ mole, per 100 g of the copolymer rubber, of 5-vinyl-2-norbornene units was produced by a known polymerization method.

The copolymer rubber was chlorinated in the same way as in Example 1 to give a chlorinated rubber having a chlorine content of 25% by weight and a Mooney viscosity, $ML_{1+4}$ (121° C.), of 53.

The chlorinated rubber was compounded, vulcanized and evaluated in the same way as in Example 1. The results are shown in Table 1.

EXAMPLE 12

An ethylene/propylene/5-vinyl-2-norbornene copolymer rubber which had a Mooney viscosity, $ML_{1+4}$ (100° C.), of 23 and contained ethylene units and propylene units in a mole ratio of 80:20 and $1.5 \times 10^{-2}$ mole, per 100 g of the copolymer rubber, of 5-vinyl-2-norbornene units was produced by a known polymerization method.

The copolymer rubber was chlorinated in the same way as in Example 1 to give a chlorinated rubber having a chlorine content of 15% by weight and a Mooney viscosity, $ML_{1+4}$ (121° C.), of 30.

The chlorinated rubber was compounded, vulcanized and evaluated in the same way as in Example 1. The results are shown in Table 1.

EXAMPLE 13

An ethylene/propylene/5-vinyl-2-norbornene copolymer rubber which had a Mooney viscosity, $ML_{1+4}$ (100° C.), of 23 and contained ethylene units and propylene units in a mole ratio of 80:20 and $1.5 \times 10^{-2}$ mole, per 100 g of the copolymer rubber, of 5-vinyl-2-norbornene units was produced by a known polymerization method.

The copolymer rubber was chlorinated in the same way as in Example 1 to give a chlorinated rubber having a chlorine content of 35% by weight and a Mooney viscosity, $ML_{1+4}$ (121° C.), of 106.

The chlorinated rubber was compounded, vulcanized and evaluated in the same way as in Example 1. The results are shown in Table 1.

EXAMPLE 14

An ethylene/propylene/5-vinyl-2-norbornene copolymer rubber which had a Mooney viscosity, $ML_{1+4}$ (100° C.), of 80 and contained ethylene units and propylene units in a mole ratio of 80:20 and $1.5 \times 10^{-2}$ mole, per 100 g of the copolymer rubber, of 5-vinyl-2-norbornene units was produced by a known polymerization method.

The copolymer rubber was chlorinated in the same way as in Example 1 to give a chlorinated rubber having a chlorine content of 35% by weight and a Mooney viscosity, $ML_{1+4}$ (121° C.), of 110.

The chlorinated rubber was compounded, vulcanized and evaluated in the same way as in Example 1. The results are shown in Table 1.

Comparative Example 5

An ethylene/1-butene copolymer rubber which had a Mooney viscosity, $ML_{1+4}$ (100° C.), of 22 and contained ethylene units and propylene units in a mole ratio of 80:20.

The copolymer rubber was chlorinated in the same way as in Example 1 to give a chlorinated rubber having a chlorine content of 25% by weight and a Mooney viscosity, $ML_{1+4}$ (121° C.), of 54.

The chlorinated rubber was compounded, vulcanized and evaluated in the same way as in Example 1. The results are shown in Table 1.

Comparative Example 6

An ethylene/propylene/5-ethylidene-2-norbornene copolymer rubber which had a Mooney viscosity, $ML_{1+4}$ (100° C.), of 26 and contained ethylene units and propylene units in a mole ratio of 80:20 and $1.5 \times 10^{-2}$ mole, per 100 g of the copolymer rubber, of 5-ethylidene-2-norbornene units was produced by a known polymerization method.

The copolymer rubber was chlorinated in the same way as in Example 1 to give a chlorinated rubber having a chlorine content of 25% by weight and a Mooney viscosity, $ML_{1+4}$ (121° C.), of 58.

The chlorinated rubber was compounded, vulcanized and evaluated in the same way as in Example 1. The results are shown in Table 1.

Comparative Example 7

An ethylene/propylene/dicyclopentadiene copolymer rubber which had a Mooney viscosity, $ML_{1+4}$ (100° C.), of 22 and contained ethylene units and propylene units in a mole ratio of 80:20 and $1.5 \times 10^{-2}$ mole, per 100 g of the copolymer rubber, of dicyclopentadiene units was produced by a known polymerization method.

The copolymer rubber was chlorinated in the same way as in Example 1 to give a chlorinated rubber having a chlorine content of 25% by weight and a Mooney viscosity, $ML_{1+4}$ (121° C.), of 61.

The chlorinated rubber was compounded, vulcanized and evaluated in the same way as in Example 1. The results are shown in Table 1.

EXAMPLE 15

A foam was produced by using the chlorinated rubber obtained in Example 14 in accordance with the following recipe.

| Ingredient | Amount (parts) |
|---|---|
| Chlorinated rubber | 100.0 |
| Stearic acid | 4.0 |
| Clay[1] | 170.0 |
| Dioctyl terephthalate | 70.0 |
| Titanium white | 15.0 |
| Polyethylene glycol ($\overline{Mw}$ 4000) | 1.0 |
| 2-Butylaminotriazine-4,6-dithiol | 3.0 |
| Vulcanization aid[2] | 4.0 |
| Blowing agent[3] | 3.0 |

[1]Satintone No. 1. Engelhard Minerals & Chem. Co.
[2]Sanceler MA, a tradename for dicyclohexylamine mercaptobenzothiazole salt made by Sanshin Chemical Co., Ltd.)
[3]Celogen OT, p,p'-hydroxybis(benzenesulfonyl hydrazide produced by Uniroyal Chem. Co.

The above ingredients were mixed by using an 8-inch open roll mill (roll surface temperature: front 50° C./rear 60° C.) to prepare a sheet having a thickness of 5 mmm. The sheet was cut into a ribbon form, and fed into an extruder (L/D=6, cylinder temperature 70° C.; die temperature 80° C.) and taken up at a rate of 2 meters/minutes to produce a tube. The die had an inside diameter of 8 mm and an outside diameter of 10 mm. The tube was continuously heat-foamed in a hot air heating vessel. The temperature of the hot air heating vessel was 200° C., and the time required for passage through the hot air heating vessel was 10 minutes. The resulting sponge had an apparent density of 0.70 and a high shape retention. Its surface was smooth.

TABLE 1

| Item | Run | | | | | | |
|---|---|---|---|---|---|---|---|
| Starting rubber | Ex.-1 | Ex.-2 | Ex.-3 | Cx.-1 | Cx.-2 | Cx.-3 | Cx.-4 |
| Alpha-olefin | butene-1 | butene-1 | butene-1 | butene-1 | butene-1 | butene-1 | butene-1 |
| (Content, mole/100 g polymer) | | | | | | | |
| 5-vinyl-2-norbornene | $1.5 \times 10^{-2}$ | $0.4 \times 10^{-2}$ | $2.5 \times 10^{-2}$ | — | — | — | — |
| 5-ethylidene-2-norbornene | — | — | — | — | $1.5 \times 10^{-2}$ | — | — |
| dicyclopentadiene | — | — | — | — | — | $1.5 \times 10^{-2}$ | — |
| 1,4-hexadiene | — | — | — | — | — | — | $1.5 \times 10^{31\ 2}$ |
| Molecular weight $\overline{Mn}$ | $4.0 \times 10^4$ | $4.7 \times 10^4$ | $2.9 \times 10^4$ | $5.5 \times 10^4$ | $5.3 \times 10^4$ | $5.0 \times 10^4$ | $4.9 \times 10^4$ |
| Molecular weight distribution $\overline{Mw}/\overline{Mn}$ | 2.8 | 2.4 | 3.9 | 2.1 | 2.2 | 2.3 | 2.3 |
| Crystallinity (%) | 5.9 | 10.4 | 1.5 | 16.9 | 7.2 | 6.6 | 6.3 |
| Chlorinated rubber | | | | | | | |
| Chlorine content (wt %) | 25 | 25 | 25 | 25 | 25 | 25 | 25 |
| $ML_{1+4}$ (121° C.) | 55 | 57 | 54 | 53 | 55 | 58 | 56 |
| Processability | | | | | | | |
| in roll milling | E | G | E | P | P | P | P |
| in extrusion | 5 | 5 | 5 | 2 | 2 | 3 | 2 |
| Vulcanizate properties | | | | | | | |
| Tensile strength TB (kg/cm$^2$) | 181 | 178 | 184 | 175 | 178 | 181 | 179 |
| Elongation EB (%) | 620 | 610 | 610 | 630 | 620 | 580 | 610 |
| Spring strength HS JISA | 69 | 69 | 69 | 68 | 69 | 70 | 69 |

| Item | Run | | | | | | |
|---|---|---|---|---|---|---|---|
| Starting rubber | Ex.-4 | Ex.-5 | Ex.-6 | Ex.-7 | Ex.-8 | Ex.-9 | Ex.-10 |
| Alpha-olefin | butene-1 | butene-1 | butene-1 | butene-1 | butene-1 | propylene | propylene |
| (Content, mole/100 g polymer) | | | | | | | |
| 5-vinyl-2-norbornene | $1.5 \times 10^{-2}$ | $1.5 \times 10^{-2}$ | $1.5 \times 10^{-2}$ | $1.5 \times 10^{-2}$ | $1.5 \times 10^{-2}$ | $1.5 \times 10^{-2}$ | $0.4 \times 10^{-2}$ |
| 5-ethylidene-2-norbornene | — | — | — | — | $1.0 \times 10^{-2}$ | — | — |
| dicyclopentadiene | — | — | — | — | — | — | — |
| 1,4-hexadine | — | — | — | — | — | — | — |
| Molecular weight $\overline{Mn}$ | $4.0 \times 10^4$ | $4.0 \times 10^4$ | $2.9 \times 10^4$ | $7.9 \times 10^4$ | $3.6 \times 10^4$ | $3.2 \times 10^4$ | $3.6 \times 10^4$ |
| Molecular weight distribution $\overline{Mw}/\overline{Mn}$ | 2.8 | 2.8 | 2.7 | 2.9 | 3.1 | 3.4 | 3.1 |
| Crystallinity (%) | 5.9 | 5.9 | 3.3 | 6.5 | 2.1 | 6.3 | 11.1 |
| Chlorinated rubber | | | | | | | |
| Chlorine content (wt %) | 15 | 35 | 25 | 25 | 25 | 25 | 25 |
| $ML_{1+4}$ (121° C.) | 29 | 105 | 20 | 160 | 59 | 56 | 57 |
| Processabilty | | | | | | | |
| in roll milling | E | E | E | E | E | E | G |
| in extrusion | 5 | 5 | 5 | 4 | 5 | 5 | 5 |
| Vulcanizate properties | | | | | | | |
| Tensile strength TB (kg/cm$^2$) | 192 | 175 | 165 | 210 | 176 | 161 | 181 |
| Elongation EB (%) | 670 | 550 | 610 | 590 | 610 | 570 | 580 |
| Spring strength HS JISA | 73 | 71 | 68 | 71 | 68 | 67 | 67 |

| Item | Run | | | | | | |
|---|---|---|---|---|---|---|---|
| Starting rubber | Ex.-11 | Ex.-12 | Ex.-13 | Ex.-14 | Cx.-5 | Cx.-6 | Cx.-7 |
| Alpha-olefin | propylene | propylene | propylene | propylene | propylene | propylene | propylene |
| (Content, mole/100 g polymer) | | | | | | | |
| 5-vinyl-2-norbornene | $2.5 \times 10^{-2}$ | $1.5 \times 10^{-2}$ | $1.5 \times ]10^{-2}$ | $1.5 \times 10^{-2}$ | — | — | — |
| 5-ethylidene-2-norbornene | — | — | — | — | — | $1.5 \times 10^{-2}$ | — |

TABLE 1-continued

|  |  |  |  |  |  |  |  |
|---|---|---|---|---|---|---|---|
| dicyclopentadiene | — | — | — | — | — | — | $1.5 \times 10^{-2}$ |
| 1,4-hexadiene | — | — | — | — | — | — | — |
| Molecular weight $\overline{M}n$ | $2.5 \times 10^4$ | $3.2 \times 10^4$ | $3.2 \times 10^4$ | $6.5 \times 10^4$ | $4.1 \times 10^4$ | $3.8 \times 10^4$ | $3.6 \times 10^4$ |
| Molecular weight distribution $\overline{M}w/\overline{M}n$ | 4.8 | 3.4 | 3.4 | 3.3 | 2.7 | 2.9 | 3.1 |
| Crystallinity (%) | 1.6 | 6.3 | 6.3 | 6.8 | 17.8 | 7.1 | 7.0 |
| Chlorinated rubber |  |  |  |  |  |  |  |
| Chlorine content (wt %) | 25 | 15 | 35 | 25 | 25 | 25 | 25 |
| $ML_{1+4}$ (121° C.) | 53 | 30 | 106 | 110 | 54 | 58 | 61 |
| Processability |  |  |  |  |  |  |  |
| in roll milling | E | E | E | E | P | P | P |
| in extrusion | 5 | 5 | 5 | 4 | 2 | 2 | 3 |
| Vulcanizate properties |  |  |  |  |  |  |  |
| Tensile strength TB (kg/cm$^2$) | 160 | 175 | 168 | 201 | 175 | 175 | 168 |
| Elongation EB (%) | 560 | 610 | 520 | 600 | 600 | 570 | 580 |
| Spring strength HS JISA | 68 | 67 | 66 | 68 | 69 | 67 | 68 |

Ex.: Example, Cx.: Comparative Example; E: Excellent;

What we claim is:

1. A vulcanizable and foamable chlorinated rubber composition comprising
    (A) a chlorinated rubber having a chlorine content of 10 to 45% by weight based on the weight of the chlorinated rubber and a Mooney viscosity, $ML_{1+4}$ (121° C.), of 10 to 190, said chlorinated rubber being obtained by chlorinating an ethylene/alpha-olefin/vinylnorbornene copolymer rubber containing ethylene units and units of an alpha-olefin having 3 to 14 carbon atoms in a mole ratio of from 50:50 to 95:5 and 3 to 30 millimoles, per 100 g of the ethylene units and the alpha-olefin units combined, of 5-vinyl-2-norbornene units,
    (B) a triazine compound represented by the general formula

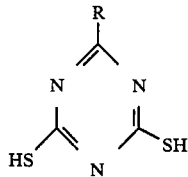

wherein R is $R^1R^2N-$, $R^1O-$, $R^1S$ or

in which $R^1$ and $R^2$ each represents a hydrogen atom, a $C_1$-$C_{20}$ alkyl group, a $C_6$-$C_{20}$ aryl group, a substituted $C_1$-$C_{20}$ alkyl group or a substituted $C_6$-$C_{20}$ aryl group, and
    (C) a chemical blowing agent.

2. The vulcanizable and foamable chlorinated rubber composition of claim 1 wherein the amount of the chemical blowing agent (D) is 0.5 to 30 parts by weight, per 100 parts by weight of the chlorinated rubber (A).

3. A foamed product obtained by vulcanizing and foaming the vulcanizable and foamable chlorinated rubber composition of claim 1 so as to provide an apparent density of 0.03 to 0.9.

* * * * *

UNITED STATES PATENT AND TRADEMARK OFFICE
CERTIFICATE OF CORRECTION

PATENT NO. : 4,877,817

DATED : October 31, 1989

INVENTOR(S) : TETSUO TOJO ET AL.

It is certified that error appears in the above-identified patent and that said Letters Patent is hereby corrected as shown below:

On the cover page of the patent, under Related U.S. Application Data, "4,764,564" should read --4,764,562--.

Signed and Sealed this

Eighteenth Day of September, 1990

Attest:

HARRY F. MANBECK, JR.

*Attesting Officer*        *Commissioner of Patents and Trademarks*